United States Patent [19]

Joly

[11] Patent Number: 4,590,116
[45] Date of Patent: May 20, 1986

[54] PIECE WITH INTEGRATED HEAT-INSULATING COVERING

[75] Inventor: Claude Joly, Puteaux, France

[73] Assignee: Bronzavia, Courbevoie, France

[21] Appl. No.: 577,221

[22] Filed: Feb. 6, 1984

[30] Foreign Application Priority Data

Feb. 8, 1983 [FR] France .................................. 83 01958

[51] Int. Cl.⁴ .......................... B32B 1/08; F16L 59/14
[52] U.S. Cl. .................................... 428/182; 138/141; 138/142; 138/148; 138/149; 138/173; 285/47; 428/920
[58] Field of Search ................ 428/182, 920; 138/121, 138/134, 142, 143, 148, 153, 173, 171; 285/47, DIG. 4; 220/445, 442, 447

[56] References Cited

U.S. PATENT DOCUMENTS

| | | | |
|---|---|---|---|
| 1,838,242 | 12/1931 | Wilson | 138/148 |
| 1,871,508 | 8/1932 | Gardner | 138/148 |
| 2,756,032 | 7/1956 | Dowell | 138/148 |
| 2,807,563 | 9/1957 | Waite et al. | 138/148 |
| 2,937,662 | 5/1960 | Green | 138/148 |
| 3,814,659 | 6/1974 | Nadeau | 428/920 |

*Primary Examiner*—Paul J. Thibodeau
*Attorney, Agent, or Firm*—Oblon, Fisher, Spivak, McClelland & Maier

[57] ABSTRACT

The invention relates to a heat insulating piece comprising a transporting duct of a storage enclosure for liquids or gases, and a heat insulating covering.

At least one layer of heat insulating material is deposited on the outer surface of the wall of the duct or of the enclosure, and an outer wall is disposed around said layer and is maintained with stiffeners which also reinforce the structure of the piece.

32 Claims, 1 Drawing Figure

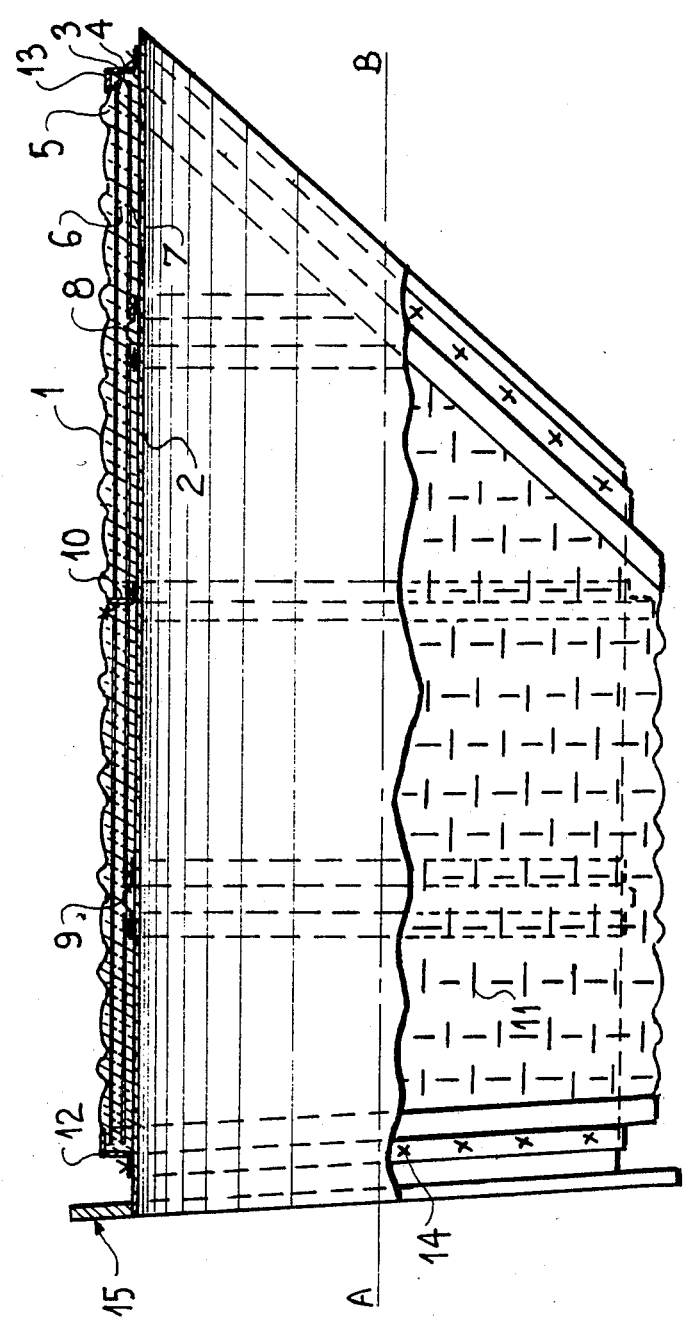

PIECE WITH INTEGRATED HEAT-INSULATING COVERING

BACKGROUND OF THE INVENTION

1. Field of the Invention

The invention relates to a piece with integrated-heat insulating covering.

2. Description of the Prior Art

Heat insulating coverings are used whenever it is necessary to comply with thermal environmental conditions inside and/outside a piece of equipment. These conditions may be related to the security of the users of said equipment, or to a requirement not to lose the heat energy accumulated in said equipment.

Thus, the exhaust pipes for gases coming from the combustion in aeroplane, boat engines or other engines, are heat insulated in concern for safety with respect to the outside and so as to maintain the temperature of the gases as far as the outlet so as not to reduce the efficiency. The same goes for certain liquid transporting ducts.

But a heat insulating covering is a device which is a complement of the equipment to be protected and, in its design, certain conditions must be complied with. It must more especially not take up too much space, be light, be easily maintained, and be impervious to the different products which, if they infiltrated inside, would adversely effect its efficiency.

In the aeronautical field in particular, the heat protection of exhaust pipes requires the accumulation of these conditions.

A heat insulating process (French Pat. No. 1 124 717) consists in using heat protection shells so as to be able to fit exactly the shape of the duct or of the wall to be insulated. These shells comprise a heat insulating padding, generally made from mineral wool, sealingly enclosed between two thin and light metal sheets made from an inoxidizable material. Heat insulating padding may be formed of several layers and, in this case, the layers are separated by reflecting screens often made from aluminum. The shape of the shells is maintained by stiffeners placed inside between the two metal sheets. The so called inner metal sheet is the one which is positioned close to the wall or the duct. The other metal sheet is said to be outside.

Such a process has drawbacks. First of all, it is difficult to provide heat insulation by means of a single shell. Two shells, complementary to each other, must in fact be used. It is then necessary to provide securing systems between the shells, so as to ensure positioning thereof on the wall.

The junction between the shells further causes a lack of thermal continuity. It frequently happens also that products harmful to the efficiency get in between the shells and the wall.

Furthermore, the wall or ducts to be heat insulated must be able to withstand different stresses and have its own rigidity, independent of that of the heat insulating covering.

SUMMARY OF THE INVENTION

The piece of the invention is formed, for example, of a transporting duct or of a storage enclosure for liquids or gases. It is characterized in that at least one layer of heat insulating material is deposited on the outer surface of the wall of the duct or of the enclosure, and in that an outer wall is disposed around the layer of heat insulating material and is maintained with stiffeners, placed on the circumference of the wall of the duct or of the enclosure. Thus, these stiffeners reinforce the structure of the piece and support said outer wall.

In one embodiment, the layer of heat insulating material is sealingly close between the outer wall and the wall of the duct or of the enclosure. Thus, no sealing problem arises.

In one other embodiment, the outer wall is made from a thin metal which is positioned around the heat insulating material. It is not necessary, because there are stiffeners, to have an outer wall with a great rigidity, because theses stiffeners which maintain said outer wall also reinforce this outer wall. Furthermore, the construction of such pieces allows the problems of junctions inherent in the use of shells to be overcome and thus the energy losses due to these junctions to be overcome. More especially, a not considerable reduction of weight appears because no securing devices and no inner metal sheet are required, and because the stiffeners are the same for the wall of the duct or of the enclosure and for the outer wall.

BRIEF DESCRIPTION OF THE DRAWINGS

Other features and advantages of the invention will appear from the description of one embodiment of a heat insulated piece, with reference to the single accompanying FIGURE, which represents an aircraft exhaust pipe thus heat insulated.

The part of the FIGURE situated above an axis A.B. shows the internal structure of a heat insulated pipe, and the part situated below the axis A.B. shows the external aspect of the pipe.

DESCRIPTION OF THE PREFERRED EMBODIMENTS

In the example, the duct comprises a cylindrical wall 2, with axis A.B., formed with a thick metal sheet. At least one layer 7 of heat insulating material, for example a mineral wool, lines the whole of the outer surface of the wall 2. An outer wall 1, cylindrical with axis A.B. having a diameter greater than that of the inner wall 2 is placed around the layer 7 of heat insulating material. Stiffeners 10 of S shape, for example, are fixed on several points, around the wall of the duct to reinforce it. Their particular shape allows them to support the outer wall 1 and to reinforce it. Thus, the outer wall 1 is firmly fixed on these stiffeners 10.

The heat insulating material layer 7 is sealingly imprisoned between the inner wall 2 and the outer wall 1. For that, means bind the outer wall 1 to wall 2 of the pipe at each of the ends of the cylinder, that is to say around each opening of the pipe.

Preferably, the outer wall 1 is formed from a thin metal sheet made from an inoxidizable material.

This metal sheet is wrapped around the heat insulating material layer 7 and is closed on itself by overlapping so as to form a cylinder. In order to provide sealing at this closure point, this latter is formed by welding. The welding may be of the capacitive type, i.e. two electrodes are placed close to each other in contact with the metal sheet, on the outer face, on the part where the overlap is provided. When the current passes therethrough, the two metal sheet thicknesses are fixed to each other.

The thin metal sheet that forms the outer wall may, before being used, be corrugated so as to give it a greater rigidity. The corrugation 11 appears on the lower part of the FIGURE.

The sealed connection between the outer wall 1 and the inner wall 2 may be provided by means of additional stiffeners 12, 13 situated in the vicinity of each opening of the pipe, and being of similar shape to the stiffeners 10 used to maintain the outer wall 1 around the heat insulating material layer.

Another way (not shown) of forming a sealed connection at the ends is to bend back the end of the outer wall 1 over the end of the inner wall 2 and to carry out welding 14 directly between these two walls.

Preferably, several layers 5, 6, 7 of heat insulating material are sandwiched between the outer wall 1 and the inner wall 2.

These layers are separated by reflecting screens 3, 4 made, for example, from aluminium.

It is desirable to integrate, between the two walls, stiffeners 8, 9 firmly fixed to the wall 2 of the pipe. For that, the stiffeners 8, 9, in the form of an omega may be fixed on the circumference of the inner wall 2, so as to reinforce this wall. These stiffeners are also welded by capacitive welding.

The invention has a very great avantage in so far as the weight of the assembly obtained is concerned. In fact, in the Prior Art, the heat insulating covering and the wall of the pipe were reinforced separately by stiffeners.

With an integrated covering, since the wall of the pipe is used for heat insulation, a smaller number of stiffeners is required. The average gain in weight for a pipe thus lagged with respect to a pipe and shell assembly is about 30%, which is very important, especially in the aeronautical field.

Maintenance of the piece thus formed is easily accomplished. Before, it was necessary to remove the shells from the pipe so as to remove the products which infiltrated between the pipe and the shells. With each dismantling, there was a risk of damage to the outer and inner walls.

With the invention, there is no longer any danger of infiltration. Only risks of impacts on the outer wall 1 remain. If the outer wall 1 is damaged after a shock, it is sufficient to fix directly to the outer wall 1, at the damaged place, a piece of thin metal sheet so as to repair it without removing the piece.

In the example, a flange ring 15 fixed to the wall of the pipe allows the heat insulated pipe to be fixed to the engine block.

What is claimed is:

1. A heat insulated piece comprising:
   (a) an inner wall having an inner surface and an outer surface;
   (b) a plurality of layers of a solid, non-fluent heat insulating material, each of said plurality of layers having an inner surface and an outer surface, the inner surface of the innermost one of said plurality of layers of heat insulating material facing the outer surface of said inner wall, said plurality of layers of heat insulating material being separated by reflecting screens;
   (c) an outer wall having an inner surface and an outer surface, said outer wall being formed from a metal sheet, the inner surface of said outer wall facing the outer surface of the outermost one of said plurality of layers of heat insulating material; and
   (d) a plurality of first stiffeners fixed both to said inner wall and to said outer wall and extending therebetween so that said inner and outer walls reinforce each other.

2. A heat insulated piece as recited in claim 1 wherein said inner wall is formed from a metal sheet.

3. A heat insulated piece as recited in claim 1 wherein said metal outer wall is inoxidizable.

4. A heat insulated piece as recited in claim 1 wherein said plurality of first stiffeners are of S shape.

5. A heat insulated piece as recited in claim 1 wherein said plurality of layers of heat insulating material are sealingly imprisoned between said inner wall and said outer wall.

6. A heat insulated piece as recited in claim 1 and further comprising means binding said outer wall to said inner wall beyond the edges of said plurality of layers of heat insulating material.

7. A heat insulated piece as recited in claim 1 wherein said outer wall is corrugated to give it greater rigidity.

8. A heat insulated piece as recited in claim 1 wherein said plurality of layers of heat insulating material are made from mineral wool.

9. A heat insulated piece as recited in claim 1 and further comprising a plurality of second stiffeners fixed to said inner wall and disposed between said inner wall and the innermost one of said plurality of layers of heat insulating material so as to reinforce said inner wall.

10. A heat insulated piece as recited in claim 1 wherein said inner wall, said plurality of layers of heat insulating material, and said outer wall are all cylindrical in shape and are all coaxial.

11. A heat insulated piece as recited in claim 10 and further comprising means binding said outer wall to said inner wall beyond the axial ends of said plurality of layers of heat insulating material.

12. A heat insulated piece as recited in claim 11 wherein said means comprise third stiffeners which are fixed both to said inner wall and to said outer wall and extend therebetween so that said inner and outer walls reinforce each other.

13. A heat insulated piece as recited in claim 10 wherein the metal sheet from which said outer wall is formed is overlapped along axial edges thereof and said axial edges are sealed to each other.

14. A heat insulated piece as recited in claim 13 wherein said axial edges are sealed to each other by welding.

15. A heat insulated piece as recited in claim 1 wherein said reflecting screens are made from aluminum.

16. A heat insulated duct comprising:
   (a) a cylindrical inner wall formed from a metal sheet, said cylindrical inner wall having an inner surface and an outer surface;
   (b) a plurality of cylindrical layers of mineral wool surrounding said cylindrical inner wall and sealingly imprisoned between said inner wall and an outer wall to be recited, each of said plurality of cylindrical layers of mineral wool being coaxial with said cylindrical inner wall and having an inner surface and an outer surface, the inner surface of the innermost one of said plurality of cylindrical layers of mineral wool being in thermal contact with the outer surface of said inner wall;
   (c) a plurality of reflecting screens made from aluminum, one of said plurality of reflecting screens separating each adjacent pair of said plurality of cylindrical layers of mineral wool;

(d) a cylindrical outer wall having an inner surface and an outer surface, said cylindrical outer wall being coaxial with said cylindrical inner wall and being corrugated to give it greater rigidity, said cylindrical outer wall being formed from a metal sheet of inoxidizable material, the inner surface of said cylindrical outer wall being in thermal contact with the outer surface of the outermost one of said plurality of cylindrical layers of mineral wool, the metal sheet from which said cylindrical outer wall is formed overlapping along axial edges thereof and said axial edges being sealed to each other by welding;

(e) a plurality of axially spaced first S-shaped stiffeners fixed both to said inner wall and to said outer wall and extending therebetween so that said inner wall and said outer wall reinforce each other;

(f) a plurality of axially spaced second Ω-shaped stiffeners fixed to said inner wall and disposed between said inner wall and the innermost one of said plurality of cylindrical layers of mineral wool so as to reinforce said inner wall; and (g) a third stiffener which is fixed both to said inner wall and to said outer wall and which extends therebetween axially beyond each axial end of said plurality of cylindrical layers of mineral wool:
  (i) to bind said cylindrical inner wall to said cylindrical outer wall;
  (ii) to sealingly confine said plurality of cylindrical layers of mineral wool; and
  (iii) to reinforce said cylindrical inner wall and said cylindrical outer wall.

17. A heat insulated piece comprising:
(a) an inner wall having an inner surface and an outer surface;
(b) at least one layer of a solid, non-fluent heat insulating material having an inner surface and an outer surface, the inner surface of said at least one layer of heat insulating material facing the outer surface of said inner wall;
(c) an outer wall having an inner surface and an outer surface, said outer wall being formed from a metal sheet, the inner surface of said outer wall facing the outer surface of said at least one layer of heat insulating material;
(d) a plurality of first stiffeners fixed both to said inner wall and to said outer wall and extending therebetween so that said inner and outer walls reinforce each other; and
(e) a plurality of second stiffeners fixed to said inner wall and disposed between said inner wall and said at least one layer of heat insulating material so as to reinforce said inner wall, said plurality of second stiffeners being Ω-shaped in cross-section.

18. A heat insulated piece as recited in claim 17 wherein said inner wall is formed from a metal sheet.

19. A heat insulated piece as recited in claim 17 wherein said metal outer wall is inoxidizable.

20. A heat insulated piece as recited in claim 17 wherein said plurality of first stiffeners are of S shape.

21. A heat insulated piece as recited in claim 17 wherein said at least one layer of heat insulating material is sealingly imprisoned between said inner wall and said outer wall.

22. A heat insulated piece as recited in claim 17 and further comprising means binding said outer wall to said inner wall beyond the edges of said at least one layer of heat insulating material.

23. A heat insulated piece as recited in claim 17 wherein said outer wall is corrugated to give it greater rigidity.

24. A heat insulated piece as recited in claim 17 wherein said at least one layer of heat insulating material is made from mineral wool.

25. A heat insulated piece as recited in claim 17 wherein said inner wall, said at least one layer of heat insulating material, and said outer wall are all cylindrical in shape and are all coaxial.

26. A heat insulated piece as recited in claim 25 and further comprising means binding said outer wall to said inner wall beyond the axial ends of said at least one layer of heat insulating material.

27. A heat insulated piece as recited in claim 26 wherein said means comprise third stiffeners which are fixed both to said inner wall and to said outer wall and extend therebetween so that said inner and outer walls reinforce each other.

28. A heat insulated piece as recited in claim 25 wherein the metal sheet from which said outer wall is formed is overlapped along said axial edges thereof and said axial edges are sealed to each other.

29. A heat insulated piece as recited in claim 28 wherein said axial edges are sealed to each other by welding.

30. A heat insulated piece as recited in claim 17 wherein a plurality of layers of solid, non-fluent heat insulating material, each of which has an inner surface and an outer surface, are sandwiched between said inner wall and said outer wall.

31. A heat insulated piece as recited in claim 30 wherein said plurality of layers of heat insulating material are separated by reflecting screens.

32. A heat insulated piece as recited in claim 31 wherein said reflecting screens are made from aluminum.

* * * * *